United States Patent

[11] 3,583,709

[72] Inventor William L. Dollenmayer
Lexington, Ky.
[21] Appl. No. 791,038
[22] Filed Jan. 14, 1969
[45] Patented June 8, 1971
[73] Assignee International Business Machines Corporation
Armonk, N.Y.

[54] SCANNING HEAD DIRECTION MEMORY DEVICE FOR RECORDING AND REPRODUCING APPARATUS
17 Claims, 13 Drawing Figs.

[52] U.S. Cl. .................... 274/4, 179/100.1, 179/100.2
[51] Int. Cl. .................... G11b 21/04
[50] Field of Search .................... 179/100.27, 100.2 CA, 100.1 DR; 274/4, 4.2 J

[56] References Cited

UNITED STATES PATENTS

| | | | |
|---|---|---|---|
| 2,846,516 | 8/1958 | Mac Chesney | 179/100.2 |
| 2,964,324 | 12/1960 | Brasseur | 179/100.2 |
| 2,998,494 | 8/1961 | Nations | 179/100.2 |
| 3,124,360 | 3/1964 | Staar | 274/4 |
| 3,291,920 | 12/1966 | Hauser | 179/100.2 |

*Primary Examiner*—Bernard Konick
*Assistant Examiner*—J. Russell Goudeau
*Attorneys*—Hanifin and Jancin and Frank C. Leach, Jr.

ABSTRACT: A magnetic head is driven in opposite directions across a recording medium for scanning in a line-by-line arrangement through stepping the magnetic head in a direction normal to its driven direction at each end of its movement in opposite direction. When it is desired to move the head manually in a direction normal to the driven locations, retaining means, which hold the head against stepping except at each end of its movement in opposite directions, is released. Memory means insures that the retaining means is returned into its retaining position in the correct relationship with the direction in which the head is being driven when manual movement is completed.

INVENTOR
WILLIAM L. DOLLENMAYER
BY Frank C. Leach Jr.
ATTORNEY

SCANNING HEAD DIRECTION MEMORY DEVICE FOR RECORDING AND REPRODUCING APPARATUS

In my copending patent application for "Transducer Driving Arrangement For Recording And Reproducing Apparatus," Ser. No. 609,232 filed Jan. 13, 1967, now U.S. Pat. No. 3,471,654, and assigned to the same assignee as the assignee of the present application, there is shown a driving arrangement for causing a magnetic head to scan a magnetic recording medium. In my aforesaid application, the magnetic head is moved for scanning in opposite directions and is stepped at each end of its driven movement.

In my aforesaid application, stepping of the magnetic head in a direction normal to its driven direction is accomplished by releasing one of a pair of pawls from a lead screw after the other of the pawls is moved into engagement with the lead screw. The relation of the lead screw to the pawls is such that each of the pawls engages the lead screw so that the head is moved in the direction normal to its driven direction for a predetermined distance by a spring motor assembly or the like. In may aforesaid application, both of the pawls may be moved out of engagement with the lead screw to allow manual movement of the magnetic head in either of the directions normal to the driven directions.

During the time that the pawls are removed from engagement with the lead screw, the magnetic head continues to move in the opposite driven directions. However, when the pawls are returned to the position in which one of them engages the lead screw, they will be returned into engagement in the same manner in which they were previously engaged.

Thus, if the magnetic head is moving in one direction when the pawls are released from the lead screw and the magnetic head is moving in the opposite direction when the pawls are returned into engagement with the lead screw, there will be a period during which information, which is being reproduced from the magnetic head, would be backwards or nonintelligible. This is because the release of the pawls for return into engagement with the lead screw when the magnetic head is moving in the opposite driven direction from that in which it was moving when the pawls were released from the lead screw would cause the magnetic head to be stepped one line in the stepping direction by the spring motor assembly as soon as the pawls are returned into engagement with the lead screw. Then, the magnetic head would have to travel to the end of its movement in the opposite direction, and the backwards or nonintelligible information would be reproduced by the magnetic head at this time. When the magnetic head reversed its direction at the end of the movement in the opposite driven direction, it would now be traveling in the correct direction and intelligible information would again be reproduced.

However, during this period when the backwards or nonintelligible information was being received, the user would be distracted and possibly confused. Furthermore, if one were attempting to dictate at this time, this dictated material would have material dictated over it when the direction of the head is reversed whereby this dictation would be lost.

The present invention satisfactorily solves the foregoing problem by utilizing a memory device that insures that the pawl, which is returned into engagement with the lead screw, is the pawl that is to be removed from engagement with the lead screw at the end of movement of the magnetic head in the direction in which it is being driven. Therefore, if the magnetic head is moving in one direction when the pawls are removed from a position in which they can engage with the lead screw and the head is moving in the opposite direction when the pawls are returned to a position in which they can engage with the lead screw, the device of the present invention insures that the pawl, which is returned into engagement with the lead screw, is the opposite of the pawl that was engaged with the lead screw when the pawls were removed from the position in which they could engage with the lead screw. Furthermore, the memory device of the present invention insures that the same pawl is returned into engagement with the lead screw as the pawl that was removed if the head is driven in the same direction as it was moving when manual movement of the head was produced by removing the pawls from a position in which they could engage the lead screw.

An object of this invention is to provide a memory device for a recording and reproducing apparatus in which the magnetic head will always continue in the desired recording path even though the head is manually moved in the stepping direction.

Another object of this invention is to provide a memory device for correlating the position of retaining means, which governs the movement of a magnetic head in a stepping direction, when the retaining means is released from its retaining position in accordance with the direction of motion of the magnetic head in its driven directions.

The foregoing and other objects, features, and advantages of the invention will be more apparent from the following more particular description of the preferred embodiments of the invention as illustrated in the accompanying drawings.

Figure 9:
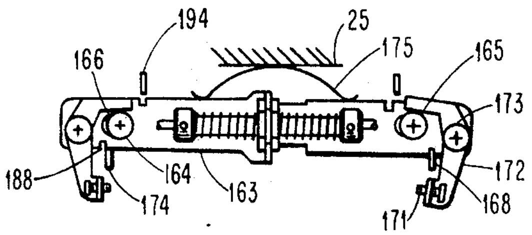
Figure 10:
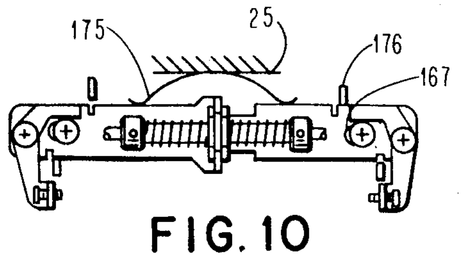
Figure 11:
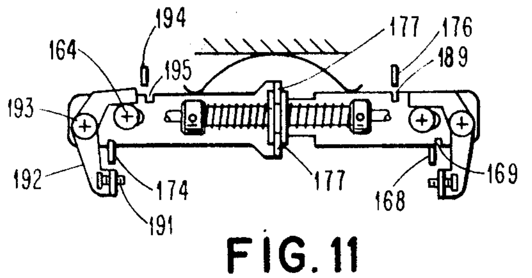
Figures 8, 13:
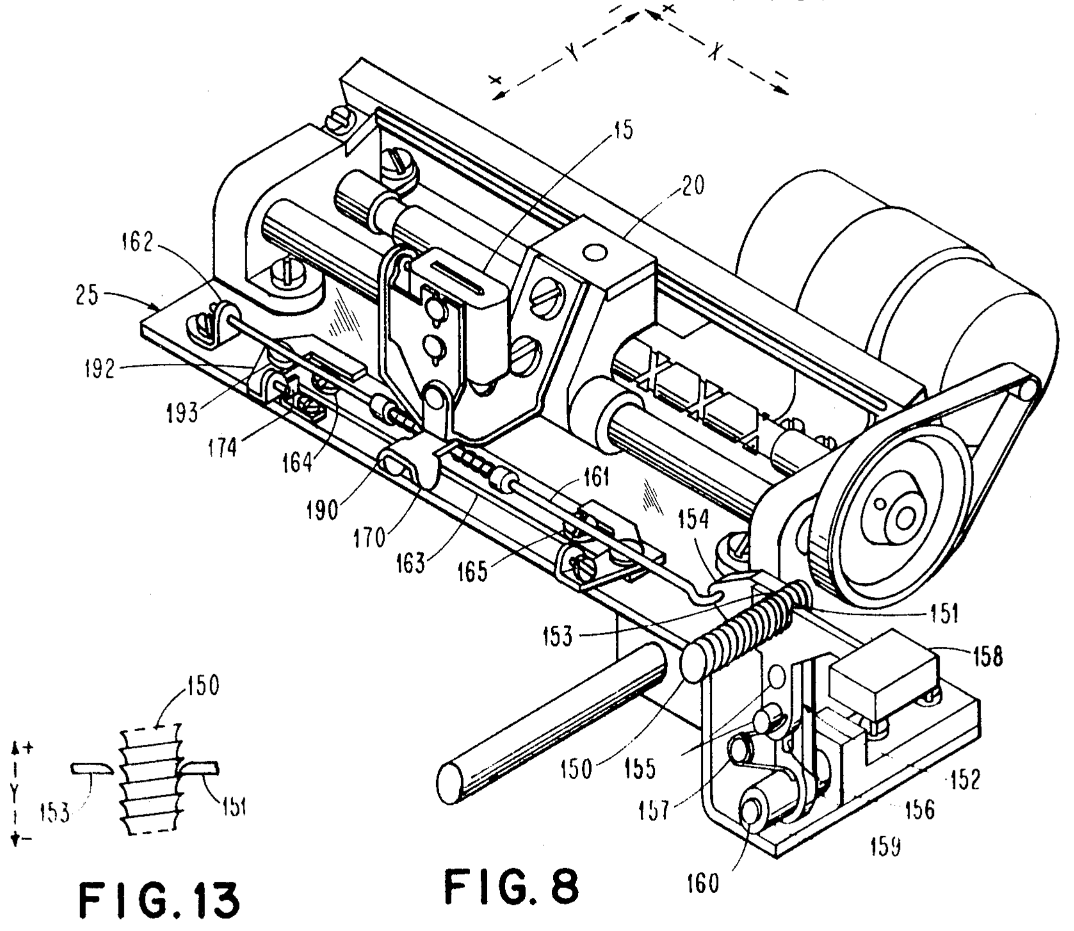
FIG. 8 is a perspective view of a recording and reproducing apparatus employing another embodiment of the memory device of the present invention.

FIGS. 9—11 are top plan views of the memory device of FIG. 8 and illustrating the positions of various portions of the memory device for various positions of the magnetic head.

Figure 12:
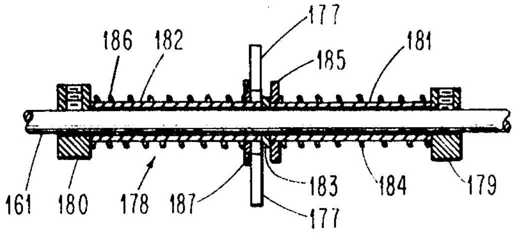

FIG. 12 is a sectional view of a portion of the memory device of FIG. 8.

FIG. 13 is a top plan view of the retaining means of the recording and reproducing apparatus of FIG. 8.

Figures 1, 2, 3:
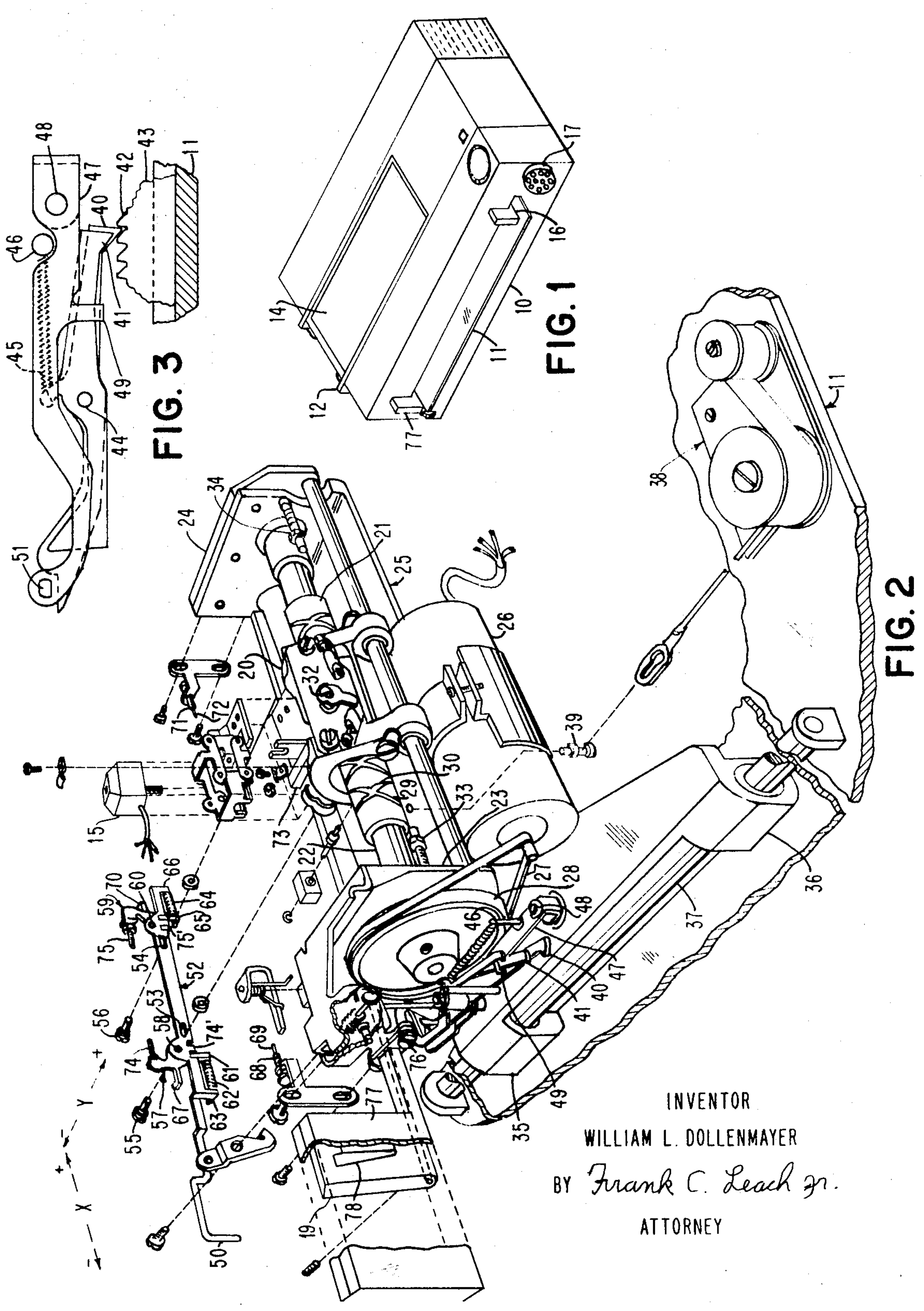
FIG. 1 is a perspective view of a dictation unit of the type in which a magnetic head is driven in opposite directions relative to a recording medium and utilizing the memory device of the present invention.
FIG. 2 is a perspective view, partly exploded, of a portion of the dictation unit of FIG. 1 and showing one form of the memory device of the present invention.
FIG. 3 is a top plan view, partly in section, of the retaining means of the present invention utilized in controlling the stepping of the magnetic head in the stepping direction.

Referring to the drawings and particularly FIG. 1, there is shown a dictation unit 10 for both recording and reproducing sound as more particularly shown and described in my aforesaid application. The dictation unit 10 includes a housing 11 having a card retainer 12 on which a magnetic record card 14 of the type more particularly shown and described in my aforesaid application is supported. The card 14 is supported in the card retainer 12 on retaining rails.

The record card 14 is scanned line-by-line by a magnetic head 15 (see FIG. 2) in alternate opposite directions designated X+ and X−. Stepping of the magnetic head 15 in a direction, which is normal to the scanning direction, is designated Y+ for normal dictation and reproduction of signals and Y− when backstepping occurs. Thus, scanning occurs in the X directions and stepping occurs in the Y+ direction.

The dictation unit 10 has a mode control lever 16 for positioning its associated switches (not shown) of the type more particularly shown and described in may aforesaid application to control the various operating modes of the dictation unit 10. The mode control lever 16 may be positioned in a playback or listen mode, a record mode, and an off mode, which is between the playback and record mode positions.

To record signals, the mode control lever 16 is disposed in the record position by being moved to the right from the off position and the user dictates material into a microphone 17, which is connected to the unit 10 by a cable and is removable from the unit 10 for dictating. When scanning is desired, a scanning lever 19 is actuated. This permits the user to move the magnetic head 15 in the Y+ and Y− directions manually while the magnetic head 15 is driven in the X directions.

The magnetic head 15 is mounted on a carrier 20, which is adapted to be moved transversely relative to the record card 14 by a double threaded lead screw 21 such as a lead screw of the "fishing reel" type. This transverse movement of the carrier 20 is in the X directions. The lead screw 21 has its shaft 22 journaled in upstanding portions 23 and 24 of a support frame 25.

The lead screw shaft 22 is rotated by a motor 26, which is supported by the frame 25, through a belt 27 cooperating with a pulley 28, which is disposed on one end of the shaft 22. Accordingly, rotation of the motor 26 continuously rotates the shaft 22 in one direction.

The lead screw 21 has spiral grooves 29 and 30 formed therein to receive a follower, which is rotatably mounted by a shaft 32 on the carrier 20. When the follower is disposed in the groove 29, the carrier 20 advances in the X+ direction while disposition of the follower in the groove 30 results in the carrier 20 advancing in the X− direction.

The grooves 29 and 30 intersect with each other along their lengths. At each end of the lead 21, there is a cutaway portion at the intersection permitting the direction of movement of the follower to change from one of the grooves 29 and 30 to the other of the grooves 29 and 30 and vice versa at each end of movement of the carrier 20 in one of the X directions.

When the carrier 20 reaches the end of its travel in either direction, it must be given an impetus in the opposite direction to cause the follower to move from one of the grooves 29 and 30 to the other of the grooves 29 and 30 to reverse the direction of movement of the carrier 20.

Accordingly, when the carrier 20 reaches the end of its movement in the X− direction, it engages a resilient bumper 33, which is supported on the upstanding portion 23 of the support frame 25. When the carrier 20 reaches the end of its movement in the X+ direction, the carrier 20 contacts a resilient bumper 34, which is supported by the upstanding portion 24 of the frame 25. Each of these engagements gives sufficient impetus in the opposite direction to cause the carrier 20 to reverse its direction of movement.

When scanning in a line-by-line arrangement as the magnetic head 15 does with respect to the record card 14, it is necessary to also be able to step the magnetic head 15 relative to the record card 14 in the Y+ direction. To allow the magnetic head 15 to move in the Y directions, the support frame 25 is slidably mounted on the housing 11. The support frame 25 has a pair of ears 35 and 36 thereon cooperating with a rod 37, which is fixed to the housing 11. Thus, whenever the frame 25 is moved along the rod 37, the magnetic head 15 is moved in one of the Y directions relative to the record card 14.

A spring motor assembly 38, which may be of the type more particularly shown and described in my aforesaid application, is connected to the support frame 25 by a screw 30 to exert a continuously urging force on the frame 25 in the Y+ direction. The spring motor assembly 38 is supported on the stationary housing 11.

The support frame 25 is held against movement by the spring motor assembly 38 through a pair of pawls 40 and 41 cooperating with teeth 42 of a rack 43. The pawls 40 and 41 are pivotally mounted on the support frame 25 by a pivot pin 44 while the rack 43 is fixed to the housing 11. A spring 45 continuously urges the pawl 41 toward engagement with the teeth 42 of the rack 43 by having one end attached to an ear on the pawl 41 and its other end connected to a pin 46 on the support frame 25. The pawl 40 is continuously urged toward engagement with the teeth 42 of the rack 43 by a spring (not shown), which is disposed beneath the spring 45 and extends between an ear on the pawl 40 and the pin 46.

A reversing pawl 47, which is pivotally mounted on the frame 25 by a pin 48, has a finger 49 engaging against a surface of the pawl 41, which is disposed above the pawl 40. Accordingly, when the reversing pawl 47 is pivoted clockwise about the pin 48, the finger 49 removes the pawl 41 from engagement with the teeth 42 of the rack 43. Just prior to the pawl 41 being withdrawn from engagement with the teeth 42, the pawl 40 engages between two of the teeth 42 by being pivoted clockwise about the pin 44 due to the force of its spring upon release of the pawl 40 from a position in which it could not engage the teeth 42 of the rack 43.

When the reversing pawl 47 is pivoted counterclockwise about the pin 48, the finger 49 of the pawl 47 no longer holds the pawl 41 from engagement with the teeth 42 of the rack 43. Thus, the spring 45 urges the pawl 41 into engagement between two of the teeth 42. When the reversing pawl 47 is pivoted counterclockwise about the pin 48, the pawl 40 is pivoted counterclockwise about the pin 44 to remove the pawl 40 from engagement with one of the teeth 42 of the rack 43. This removal of the pawl 40 from one of the teeth occurs just after the pawl 41 is disposed between two of the teeth 42.

The distance between the teeth 42 of the rack 43 is such that when one of the pawls 40 and 41 moves out of engagement with one of the teeth 42 and the other of the pawls moves into engagement between two of the teeth 42, the frame 25 is moved a predetermined distance by the spring motor assembly 38 until the pawl engages the next of the teeth 42. Thus, each stepping of the frame 25 by the spring motor assembly 38 is a predetermined distance.

The control of the positions of the reversing pawl 47 and the pawl 40 is by a rod 50, which forms part of a memory means mounted on the frame 25 and actuatable by the position of the carrier 20. The rod 50 is disposed within an opening 51 (see FIG. 3) in the reversing pawl 47 and acts against a surface of the pawl 40 when it is moved toward the rack 43.

Accordingly, when the carrier 20 moves the magnetic head 15 in the X− direction, the rod 50 causes counterclockwise rotation of the reversing pawl 47 about the pivot pin 48 and counterclockwise rotation of the pawl 40 about the pivot pin 44. As a result, the finger 49 no longer retains the pawl 41 out of engagement with the teeth 42 of the rack 43 whereby the spring 45 urges the pawl 41 into engagement between two of the teeth 42 of the rack 43. The counterclockwise rotation of the pawl 40 is against the force of its spring whereby the pawl 40 is moved out of engagement with one of the teeth 42 of the rack 43.

When the carrier 20 completes movement in the X+ direction, the rod 50 causes clockwise rotation of the reversing pawl 47 whereby the finger 49 produces counterclockwise rotation of the pawl 41 against the force of the spring 45 to remove the pawl 41 from engagement with one of the teeth 42 of the rack 43. This movement of the rod 50 also allows the pawl 40 to be rotated clockwise by its spring into engagement between two of the teeth 42 of the rack 43. Thus, whenever one of the pawls 40 and 41 is removed from engagement with one of the teeth 42 on the rack 43, the other of the pawls 40 and 41 is moved into engagement between two of the teeth 42 of the rack 43 and prior to removal of the one pawl. However, because of the spacing between the teeth 42 in comparison with the size of the pawls 40 and 41 and the longitudinal spacing between the pawls 40 and 41, each removal of one of the pawls 40 and 41 and return of the other of the pawls 40 and 41 into engagement with the teeth 42 creates movement of the predetermined distance in the Y+ direction by the spring motor assembly 38 exerting its continuous force on the support frame 25.

The rod 50 is an integral part of a mounting bar 52, which is mounted on the support frame 25 for sliding movement relative thereto. The bar 52 has a pair of longitudinal slots 53 and 54 therein to receive mounting screws 55 and 56, respectively, for attaching the bar 52 to the frame 25 while still allowing sliding movement relative thereto because the slots 53 and 54 are larger than the diameters of the screws 55 and 56.

A bellcrank 57 is pivotally mounted on the mounting bar 52 by a pin 58 while the bellcrank 59, which is disposed in longitudinally spaced relation to the bellcrank 57, is pivotally mounted on the mounting bar 52 by a pin 60. The bellcrank 57 has a leg 61 extending beneath the mounting bar 52 and connected to one end of a spring 62, which has its other end secured to a depending ear 63 of the mounting bar 52, whereby the bellcrank 57 is continuously urged clockwise. The bellcrank 59 is continuously urged counterclockwise by a spring 64, which is connected between a downwardly extending leg 65 of the bellcrank 59 and a depending ear 66 of the mounting bar 52.

The bellcrank 57 has a finger 67 cooperating with a stop 68, which is supported on the frame 25. The stop 68 has a reduced portion 69, and the finger 67 is either disposed beneath the reduced portion 69 or disposed beneath the main portion of the stop 68 depending on the position of the mounting bar 52.

The bellcrank 59 has a finger 70 cooperating with a stop 71, which is supported on the frame 25. The stop 71 has a reduced portion 72, and the finger 70 is held either beneath the reduced portion 72 or beneath the main portion of the stop 71 depending on the position of the mounting bar 52.

When the carrier 20 is completing movement in the X− direction, one side of an arm 73 on the carrier 20 engages an adjusting screw 74 on the bellcrank 57 to pivot the bellcrank 57 counterclockwise about the pin 58 against the force of the spring 62 until the leg 61 of the bellcrank 57 engages a stop 74′ on the mounting bar 52. When this occurs, the motion of the carrier 20 in the X− direction urges the bar 52 in the X− direction until the finger 67, which has been urged beneath the reduced portion 69 of the stop 68 by the spring 62, is moved beneath the main portion of the stop 68. Because of the spring 62, the finger 67 is held beneath the main portion of the stop 68 with a positive pressure.

As a result of the mounting bar 52 moving in the X− direction to move the rod 50 in the X− direction, the rod 50 pivots the reversing pawl 47 and the pawl 40 counterclockwise. This removes the pawl 40 from engagement with one of the teeth 42 of the rack 43 and moves the pawl 41 into engagement between two of the teeth 42 of the rack 43.

Thus, stepping of the frame 25 occurs when the arm 73 on the carrier 20 engages the screw 74 on the bellcrank 57. The amount of movement of the mounting bar 52 in the X− direction is limited because of the size of the longitudinal slots 53 and 54 with respect to the diameters of the mounting screws 55 and 56.

When the carrier 20 is completing movement in the X+ direction, the other side of the arm 73 engages an adjusting screws 75 on the bellcrank 59 to cause clockwise rotation of the bellcrank 59 against the force of the spring 64 until the leg 65 of the bellcrank 59 engages a stop 75′ on the mounting bar 52. When this occurs, the motion of the carrier 20 in the X+ direction urges the bar 52 in the X+ direction until the finger 70, which has been bearing against the reduced portion 72 of the stop 71, is moved beneath the main portion of the stop 71.

The movement of the mounting bar 52 in the X+ direction results in the rod 50 pivoting the reversing pawl 47 clockwise and allowing the pawl 40 to pivot clockwise because of the force of its spring. That is, the end of the pawl 40 follows the movement of the rod 50 because of the force of its spring. Accordingly, the pawl 40 moves into engagement between two of the teeth 42 of the rack 43 while the pawl 41 is moved out of engagement with one of the teeth 42 of the rack 43 because of the finger 49 of the reversing pawl 47 exerting a force on the pawl 41 against the force of the spring 45. This allows the frame 25 to be stepped by the spring motor assembly 38 in the Y+ direction until the pawl 40 engages the next of the teeth 42.

When the mounting bar 52 moves in the X+ direction, the finger 67 of the bellcrank 57 is removed from beneath the main portion of the stop 68 and now engages beneath the reduced portion 69 of the stop 68. A similar arrangement exists when the mounting bar 52 is moved in the X− direction; at this time, the finger 70 of the bellcrank 59 is removed from beneath the main portion of the stop 71 and engages beneath the reduced portion 72 of the stop 71.

Accordingly, each completion of travel by the magnetic head 15 in each of its scanning directions results in stepping of the magnetic head 15 with respect to the record card 14 in the Y+ direction. Thus, a recording path of the type shown and described in my aforesaid application is formed on the record card 14.

As previously mentioned, the scanning lever 19 is utilized to permit manual scanning of the record card 14 by the magnetic head 15. That is, manual scanning occurs by allowing manual movement of the head 15 in the Y directions while the head 15 still scans the record card 14 in the X directions.

In order to permit this manual movement of the head 15 in the Y directions, it is necessary to remove the pawls 40 and 41 from engagement with the teeth 42 of the rack 43. When the scanning lever 19 is actuated, it pivots and causes an L-shaped rod 76, which is fixed to the lever 19, to pivot. The lever 19 is pivotally supported in an extension 77 of the frame 25. A leaf spring 78 continuously urges the lever 19 to the position in which the L-shaped rod 76 does not affect the pawls 40 and 41.

Accordingly, a force must be exerted on the scanning lever 19 to cause pivoting of the L-shaped rod 76 whereby the rod 76 engages the ends of the pawls 40 and 41 to pivot the pawls 40 and 41 counterclockwise and remove the pawls 40 and 41 from engagement with the teeth 42 of the rack 43. Of course, when the rod 76 engages the pawls 40 and 41, only one of the pawls is in engagement with one of the teeth 42 of the rack 43.

With the pawls 40 and 41 released from engagement with the teeth 42 of the rack 43 by the scanning lever 19 being actuated, the frame 25 may be manually moved in either of the Y directions. During the time that the frame 25 is moved in one of the Y directions, the magnetic head 15 continues to move in the X directions.

However, because of the mounting bar 52 being responsive to the movements of the magnetic head 15 in the X directions even when the pawls 40 and 41 are held out of engagement with the teeth 42 of the rack 43 by the scanning lever 19, the rod 50 continues to move with the mounting bar 52. Accordingly, the rod 50 is properly positioned in coordination with the direction of movement of the magnetic head 15 when the scanning lever 19 is released.

Thus, if the magnetic head 15 is moving in the X− direction when the pawls 40 and 41 are released by the scanning lever 19, the pawl 40 would have been in engagement with one of the teeth 42 of the rack 43. Then, if the head 15 is moving in the X+ direction when the scanning lever 19 is released, the rod 50 will be positioned so that the pawl 41 moves into engagement with one of the teeth 42 of the rack 43. Accordingly, the magnetic head 15 continues to follow the desired path of scanning.

If the rod 50 were not responsive to the movements of the magnetic head 15 during the time that the scanning lever 19 is actuated and the head 15 were moving in the X+ direction upon release of the scanning lever 19 while the head 15 had been moving in the X− direction when the scanning lever 19 was actuated, the pawl 40 would have returned into engagement with one of the teeth 42 of the rack 43 when the scanning lever 19 was released. This would have resulted in the head 15 being immediately stepped into an X− track. Thus, backwards or nonintelligible information would have been reproduced for the remainder of the movement of the head 15 in the X+ direction. Upon completion of movement of the head 15 in the X+ direction, there would be no stepping in the Y+ direction. When the head 15 started to move in the X− direction, it would again be receiving intelligible information since it was already in the X− track.

By utilizing the rod 50 on the mounting bar 52 and always moving the mounting bar 52 in response to changes in directions of the magnetic head 15 in the X directions irrespective of whether the scanning lever 19 is actuated or not, the pawls 40 and 41 will be properly positioned whenever the scanning lever 19 is released. During the time that the L-shaped rod 76 is engaging against the pawls 40 and 41, the rod 50 only moves the reversing pawl 47. This is due to the end of the pawl 40 being held by the rod 76 in a position in which the rod 50 cannot engaged the pawl 40. Upon release of the scanning lever 19, the rod 50 will be positioned to hold the pawl 40 out of engagement with the teeth 42 of the rack 43 if the magnetic head 15 is moving in the X+ direction and to allow the pawl 40 to return into engagement with one of the teeth 42 of the rack 43 if the magnetic head 15 is moving in the X− direction. This insures correct synchronization of the positions of the pawls 40 and 41 irrespective of the amount of manual movement of the magnetic head 15 in either of the Y directions.

Figure 4:
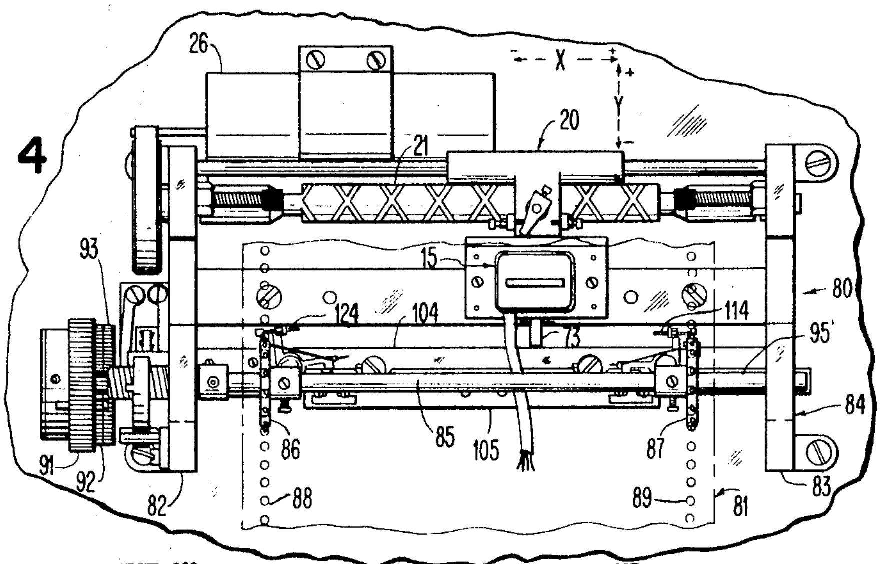
FIG. 4 is a top plan view of another type of recording and reproducing apparatus utilizing another form of the memory device of the present invention.
Figures 5, 6:
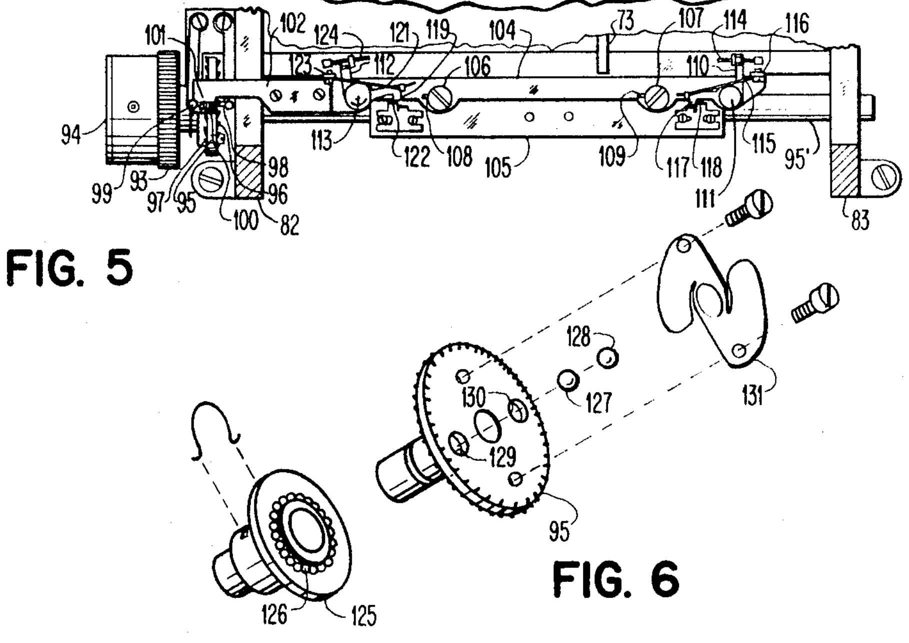
FIG. 5 is a top plan view, partly in section, of a portion of the structure of FIG. 4.
FIG. 6 is an exploded perspective view of a clutch of the structure of FIG. 4.

Referring to FIGS. 4—6, there is shown another form of the memory means of the present invention utilized with a dictation unit 80 of another type of recording and reproducing apparatus. In the embodiment of FIGS. 4—6, a magnetic record card 81, which is similar to the card 14, is stepped in the Y directions rather than the support frame 25 for the magnetic head 15 being stepped in the Y directions as in the embodiment of FIGS. 1—3.

As shown in FIGS. 4—6, the lead screw 21 for driving the magnetic head 15 in the X directions is rotatably supported in upstanding portions 82 and 83 of a fixed support frame 84. Thus, the magnetic head 15 is driven in the X directions in the same manner as previously described for the embodiment of the FIGS. 1—3.

The upstanding portions 82 and 83 also rotatably support a shaft 85 having a pair of sprockets 86 and 87 fixed thereto for rotation therewith. The sprockets 86 and 87 are spaced from each other and have their teeth adapted to be disposed in apertures 88 and 89, respectively, in the magnetic record card 81, which is the same as the card 14 except for the two longitudinal rows of the apertures 88 and 89.

The card 81 may be loaded within a housing of the dictation unit 80 by having the sprockets 86 and 87 engage with the apertures 88 and 89 in the card 81. Then, turning of a knob 91, which is fixed to the shaft 85, causes loading of the card 81 within the housing.

As the knob 91 is rotated, a gear 92, which is fixed to the shaft 85, also is rotated to drive a gear 93, which has a spring motor assembly 94 connected therewith for rotation therewith. Accordingly, as the gear 93 is rotated by the gear 92, the spring motor assembly 94 has its spring wound.

When the card 81 has been completely loaded within guides in the housing and dictation is ready to begin, the energization of the motor 26 results in the magnetic head 15 moving in the X directions in the manner previously described for the embodiment of FIGS. 1—3.

The spring of the spring motor assembly 94 is prevented from rotating in the opposite direction to which it is wound by a ratchet wheel 95, which is mounted for rotation with the spring of the spring motor assembly 94. The ratchet wheel 95 is rotatably mounted on a rod 95′, which is fixed to the frame 84 and has one end of the spring of the spring motor assembly 94 fixed thereto. The ratchet wheel 95 has teeth 96 and 97 on opposite sides thereof with the teeth on one of the sides being staggered with respect to the teeth on the other side as shown in FIG. 5.

A pawl 98, which is pivotally mounted on the frame 84, cooperates with the teeth 96 while a pawl 99, which also is pivotally mounted on the frame 84, cooperates with the teeth 97. The pawls 98 and 99 are continuously biased towards each other and towards engagement with the teeth on the ratchet wheel 95 by a spring 100, which is connected to each of the pawls 98 and 99 at their ends remote from their pivotal connections to the frame 84.

The teeth 96 and 97 on the ratchet wheel 95 are designed so that winding of the spring of the spring motor assembly 94 allows each of the pawls 98 and 99 to be easily passed. However, rotation by the force of the spring in the opposite direction whereby the record card 81 would be fed by the sprockets 87 and 88 in the Y+ direction is prevented by the pawls 98 and 99 cooperating with the teeth 96 and 97, respectively.

A finger 101 on an arm 102 of a memory means is disposed between the pawls 98 and 99. When the memory means is actuated due to the magnetic head completing its movement in the X+ direction, the arm 102 of the memory means is pulled so that the pawl 98 is moved out of engagement with one of the teeth 96 and the pawl 99 is moved into the position for cooperation with one of the teeth 97.

The relation of the teeth 96 with respect to the teeth 97 is such that the spring motor assembly 94 rotates the ratchet wheel 95 a predetermined distance whenever the pawl 98 is removed from engagement with one of the teeth 96 and the pawl 99 is moved in engagement between two of the teeth 97. The arm 102 pulls the finger 101 in a direction so that the pawl 99 drops into position between two of the teeth 97 before the pawl 98 is pulled from engagement with one of the teeth 96.

When the magnetic head 15 completes its movement in the X− direction, the movement of the finger 101 pushes the pawl 99 out of engagement with one of the teeth 97 on the ratchet wheel 95 after it has allowed the pawl 98 to fall in between two of the teeth 96 on the ratchet wheel 95 due to the force of the spring 100. Thus, when the pawl 99 is removed from engagement with the teeth 97, the spring motor assembly 94 steps the card 81 in the Y+ direction a predetermined distance.

The memory means includes a bar 104, which is slidably mounted on a plate 105 of the support frame 84. The bar 104 is secured to the plate 105 by a pair of screws 106 and 107 extending through longitudinal slots 108 and 109 in the bar 104.

Movement of the bar 104, which has the arm 102 fixed thereto, is controlled by the position of the magnetic head 15. Thus, the arm 73 on the carrier 20, which supports the magnetic head 15, is utilized to control the position of the bar 104 in the same manner as the arm 73 controls the position of the bar 52 in the embodiment of FIGS. 1—3.

The bar 104 has a bellcrank 110 pivotally mounted on one end thereof by a pin 111 and a bellcrank 112 pivotally mounted on the other end thereof by a pin 113. When the magnetic head 15 is nearing the completion of its movement in the X+ direction, one side of the arm 73 engages an adjusting screw 114 on the bellcrank 110 to pivot the bellcrank 110 clockwise against the force of a spring 115, which has one end secured to the bellcrank 110 and its other end attached to a stop 116 on the bar 104. Thus, the spring 115 continuously urges the bellcrank 110 to a position in which a finger 117 on the bellcrank 110 is urged toward engagement with a stop 118 on the plate 105.

Therefore, when the arm 73 engages the screw 114 on the bellcrank 110 as the head 15 completes its movement in the X+ direction, the bellcrank 110 pivots clockwise until the screw 114 engages the stop 116. By this time, the finger 117 of the bellcrank 110 will have cleared the stop 118 on the plate 105 whereby the spring 100 and the force due to the carrier 20 moving in the X+ direction urges the bar 104 in the X+ direction. When this occurs, the pawl 99 drops in between two of the teeth 97 on the ratchet wheel 95. The, the force of the spring 100 and the force due to the carrier 20 moving in the X+ direction acting through the bar 104 remove the pawl 98 from engagement with one of the teeth 96 whereby the magnetic record card 81 is stepped in the Y+ direction by the spring motor assembly 94. The stepping ceases when the pawl 99 engages against the next adjacent of the teeth 97 on the ratchet wheel 95.

As the bar 104 moves in the X+ direction, a finger 119 on the bellcrank 112, which is pivotally mounted on the bar 104, is urged by a spring 121 to move into a position for cooperation with a stop 122 on the plate 105. The spring 121 has one end connected to the bellcrank 112 and its other end attached to a stop 123 on the bar 104 to continuously urge the bellcrank 112 clockwise.

When the finger 119 drops behind the stop 122, there can be no return movement of the bar 104 in the X− direction at this time due to the cooperation between the finger 119 and the stop 122. Thus, the record car 81 will be stepped in the Y+ direction only the predetermined distance by the spring motor assembly 94.

As completion of movement of the head 15 in the X− direction is occurring, the other side of the arm 73 engages an adjusting screw 124 on the bellcrank 112 to pivot the bellcrank 112 counterclockwise against the force of the spring 121. The stop 123 limits the counterclockwise pivoting of the bellcrank 112 by the arm 73. Thus, the screw 124 engages the stop 123 to determine the amount of counterclockwise pivoting of the bellcrank 112 produced by movement of the head 15 in the X− direction.

The counterclockwise pivoting of the bellcrank 112 removes the finger 119 from engagement with the stop 122 whereby the bar 104 is moved in the X− direction by the force of the spring 100 and the motion of the carrier 20. Thus, when the finger 119 is released from engagement with the stop 122 by the arm 73, the force of the spring 100 due to the pawl 98 moving into engagement between two of the teeth 96 on one side of the ratchet wheel 95 and the force due to movement of the carrier 20 in the X− direction pull the bar 104 is in the X− direction. As soon as the pawl 98 is disposed between two of the teeth 96, the finger 101 of the arm 102 removes the pawl 99 from engagement with one of the teeth 97. When the pawl 99 is removed from engagement with one of the teeth 97, the spring motor assembly 94 rotates the ratchet wheel 95 until the next of the teeth 96 engages the pawl 98. This results in the magnetic record card 81 being advanced the predetermined distance in the Y+ direction by the sprockets 86 and 87.

When the bar 104 moves in the X− direction, the finger 117 moves into the position in which it will engage the stop 118 as shown in FIG. 5. This prevents any movement of the bar 104 in the X+ direction upon the release of the pawl 99 from engagement with one of the teeth 97.

Whenever it is desired to manually scan, the knob 91 is turned in either direction to manually move the record card 81 in one of the Y directions relative to the magnetic head 15. As previously mentioned, the teeth 96 and 97 on the ratchet wheel 95 are so designed that the pawls 98 and 99 will ride over the teeth 96 and 97, respectively, when the knob 91 is rotated to wind the spring. This direction of rotation of the knob 91 causes movement of the record card 81 in the Y− direction. Thus, this is backward stepping of the record card 81.

Movement of the record card 81 in the Y+ direction, which is forward stepping direction of the card 81, also is accomplished by rotating the knob 91. The knob 91 is rotated in the opposite direction to which it is rotated when the spring of the spring motor assembly 94 is wound.

The connection between the spring motor assembly 94 and the ratchet wheel 95 includes a clutch to allow rotation of the sprockets 87 and 88 by rotation of the knob 91 in the direction in which they are normally rotated by the spring when one of the pawls 98 and 99 is removed from engagement with the teeth 96 and 97. The clutch allows this forward rotation of the sprockets by the knob 91.

As shown in FIG. 6, the clutch includes a plate 125, which is fixed to the gear 93 for rotation therewith, having a circular row of recesses 126 therein for cooperation with the diametrically disposed pair of balls 127 and 128, which are disposed within passages 129 and 130, respectively, in the ratchet wheel 95. The ratchet wheel 95 has a spring 131 fixed thereto and urging each of the balls 127 and 128 into engagement with two of the recesses 126 in the plate 125. Thus, when the knob 91 is rotated in the direction to wind the spring of the spring motor assembly 94, the force of the spring 131 retains the balls 127 and 128 in the recesses 126 in which they are disposed. This is because the shape of the teeth 96 and 97 allows the pawls 98 and 99 to ride thereover so that there is no retarding force on the ratchet wheel 95 by the pawls 98 and 99.

When the knob 91 is rotated in the opposite direction to that in which the spring of the spring motor assembly 94 is wound, one of the pawls 98 and 99 prevents the ratchet wheel 95 from rotating. As a result, when the knob 91 rotates the gear 93, which is attached to the spring motor assembly 94, this turning force overcomes the force of the spring 131 whereby the balls 127 and 128 are cammed out of the recesses 126 in the plat 125 and dropped into the next adjacent recesses of the two diametrically disposed recesses 126 in which they had been disposed. The spring 131 allows the balls 127 and 128 to partially move through the passages 129 and 130 due to rotation of the knob 91 to cause manual movement of the record card 81 in the Y+ direction.

During the time that the record card 81 is being manually moved in one of the Y directions, the head 15 continues to move in the X directions. Thus, each time that the head 15 completes movement in the X+ direction, the bar 104 is moved in the X+ direction, and each time that the head 15 completes movement in he X− direction, the bar 104 is moved in the X− direction. Accordingly, the pawls 98 and 99 are properly positioned by the bar 104 during the time that manual scanning is occurring.

Accordingly, when turning of the knob 91 ceases, the pawls 98 and 99 are properly positioned by means of the bar 104. This allows the head 15 to remain in the proper track and causes correct stepping of the magnetic head 15 at the end of movement in one of the X directions. If the memory means of this embodiment were not utilized, the same problem would exist as to the head 15 moving in the wrong direction as previously mentioned for the embodiment of FIGS. 1—3.

Figure 7:
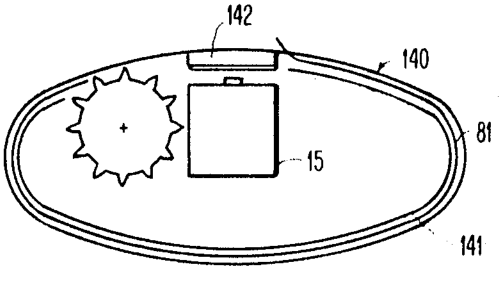
FIG. 7 is a schematic view of another form of recording and reproducing apparatus with which the memory device of FIGS. 4—6 may be employed.

It should be understood that the sprockets 87 and 88 may drive the card 81 in either a longitudinal direction or in a closed path direction. For example, as schematically shown in FIG. 7, the card 81 could be inserted into a housing 140 and fed through a curved guide passage 141 in the housing 140 until one of the sprockets 87 and 88 engages he longitudinal row of apertures in the card 81. It should be understood that the card 81 may be driven by only one of the sprockets in either this embodiment or the embodiment of FIGS. 4—6.

The sprocket would be rotated manually by turning the knob 91 in the direction that winds the spring of the spring motor assembly to advance the card 81 between the magnetic head 15 and a pressure pad 142. Upon completion of winding of the sprocket, energization of the motor 26 for driving the carrier 20, which supports the magnetic head 15, would cause the magnetic head 15 to move beneath the card 81 in opposite scanning directions in the same manner as previously described. Of course, the pressure pad 142 would be positioned to hold the card 81 in close contact with the magnetic head 15.

The memory means of FIGS. 4—6 would be utilized with this apparatus in the same manner as with the embodiment of FIGS. 4—6. Thus, manual scanning by moving the card 81 relative to the magnetic head 15 could be produced.

When recording is completed, the sprocket would be rotated by the knob 91. This would return the card 81 to the position shown in FIG. 7 wherein the end of the card 81 could be grasped and removed from the housing 140

Referring to FIGS. 8—13, there is shown another form of the invention. The memory means is utilized with the movable support frame 25 of the type more particularly shown and described in the embodiments of FIGS. 1—3. The memory means of this embodiment rotates in addition to moving in one of the X directions upon the magnetic head 15 completing movement in each of the X directions.

The frame 25 is stepped by the spring motor assembly in the same manner as previously described for the embodiment of FIGS. 1—3. However, a different arrangement is utilized for controlling the stepping of the frame 25 in the Y+ direction by the spring motor assembly. A lead screw 150, which is of the the type shown and described in my aforesaid application, is utilized.

The lead screw 150 is formed with a threaded configuration so that a surface on one side cooperates with a tooth 151 of a pawl 152 and a surface on the opposite side cooperates with a tooth 153 of the pawl 152. The lead screw 150 has a predetermined threaded configuration whereby the head 15 is moved in a predetermined distance in the Y+ direction by the spring motor assembly during each time that one of the teeth 151 and 153 is removed from engagement with the lead screw 150 and the other of the teeth 151 and 153 is moved into engagement with the lead screw 150. Thus, the head 15 is stepped a predetermined distance in the Y+ direction due to the predetermined threaded configuration of the lead screw 150.

The pawl 152 is slidably mounted in a vertical direction on a lever 154 by means of pins 155 on the pawl 152 being disposed in slots 156 in the lever 154. A spring 157 continuously urges the pawl 152 upwardly so that one of the teeth 151 and 153 is in engagement with the lead screw 150. However, downward movement of the pawl 152 by pushing on a scanning button 158 on the pawl 152 causes the pawl 152 to move downwardly against the force of the spring 157 whereby the teeth 151 and 153 are removed from engagement with the lead screw 150. When this occurs, the magnetic head 15 may be moved manually in either of the Y directions.

The lever 154 is fixed to a sleeve 159 by suitable means such as welding, for example. The sleeve 159 is rotatably mounted on a rod 160, which is fixed to the support frame 25. Accordingly, clockwise pivoting of the lever 154 about the longitudinal axis of the rod 160 results in the tooth 153 being moved into engagement with the lead screw 150 while the counterclockwise pivoting of the lever 154 about the rod 160 results in the tooth 151 being moved into engagement with the lead screw 150.

The position of the lever 154 is controlled by a rod 161 of the memory means. The rod 161 is connected at one end to the lever 154 and has its other end slidably supported in an ear 162 on the support frame 25. The rod 161 is moved in response to movements of the magnetic head 15 in the X directions through a slide 163 of the memory means.

The slide 163 is slidably mounted on the support frame 25 by having a pair of mounting screws 164 and 165 extend through slots 166 (see FIG. 9) and 167 (see FIG. 10), respectively, in the slide 163. Thus, the slide 163 may move in either of the X directions.

When the head 15 is moving in the X− direction, the slide 163 is held in the position of FIG. 9 by a detent 168, which is supported on the frame 25, being disposed within a notch 169 in the slide 163. As the head 15 nears completion of its movement in the X− direction, a tab 170 (see FIG. 8), which is mounted on the carrier 20, engages an adjusting screw 171 (see FIG. 9) on a bellcrank 172, which is pivotally mounted on the slide 163 by a stud 173.

As the magnetic head 15 continues to move in the X− direction, the tab 170 exerts a force on the adjusting screw 171 to pivot the bellcrank 172 counterclockwise about the stud 173 until the bellcrank 172 engages the mounting screw 165. When this occurs, the screw 165 acts as an instantaneous center for the bellcrank 172 whereby the slide 163 rotates about a detent 174, which is fixed to the frame 125 and engaging the slide 163. This results in the slide 163 rotating counterclockwise sufficiently to remove the detent 168 from the notch 169.

This counterclockwise rotation of the slide 163 about the detent 174 is against the force of a spring 175, which is fixed to a portion of the frame 25. The spring 175 continuously urges the slide 163 to a position in which the detent 168 is disposed within the notch 169.

The amount of counterclockwise rotation of the slide 163 about the detent 174 is limited by the slide 163 engaging a stop 176, which is supported on the frame 25. When the slide 163 engages the stop 176, the continued force of the carrier 20 moving in the X− direction causes the tab 170 to continue to exert a force on the bellcrank 172. Accordingly, this continued force in the X− direction causes sliding of the slide 163 in the X− direction since the detent 168 is not disposed in the notch 169 in the slide 163.

This movement of the slide 163 in the X− direction moves the rod 161 in the X− direction to cause clockwise pivoting of the lever 154 about the rod 160. This first moves the tooth 153 into engagement with the lead screw 150 and then removes the tooth 151 from engagement with the lead screw 150 because the linear distance between the teeth 151 and 153 is less than the diameter of the lead screw 150 as shown in FIG. 13. As soon as the tooth 151 is removed from engagement with the lead screw 150, the force of the spring motor assembly acting on the frame 25 moves the frame 25 in the Y+ direction the predetermined distance, which is determined by the distance between the threads of the lead screw 150.

The slide 163 pushes the rod 161 in the X− direction through fingers 177 on the side 163 acting on a preloaded spring assembly 178. The preloaded spring assembly 178 acts as a rigid connection between the slide 163 and the rod 161 as long as the pawl 152 is disposed in the position of FIG. 8 wherein one of the teeth 151 and 153 is in engagement with the lead screw 150.

The preloaded spring assembly 178 includes a pair of stops 179 and 180, which are fixed to the rod 161, having a pair of hollow cylindrical members 181 and 182 extending therebetween and spaced from each other by a washer 183, which is the same width as each of the fingers 177 of the slide 163. A preloaded spring 184 surrounds the hollow cylindrical member 181 and acts between the fixed stop 179 and an annular member 185, which is slidably mounted on the hollow cylindrical member 181. A preloaded spring 186 surrounds the hollow cylindrical member 182 and is disposed between the fixed stop 180 and an annular member 187, which is slidably mounted on the hollow cylindrical member 182. Whenever one of the teeth 151 and 153 is in engagement with the lead screw 150, the force of the springs 184 and 186 is sufficient to prevent movement of the annular member 185 relative to the hollow cylindrical member 181 by the fingers 177 when the slide 163 moves in the X− direction and movement of the annular member 187 relative to the hollow cylindrical member 182 by the fingers 177 when the slide 163 moves in the X+ direction.

When the slide 163 moves in the X− direction to move the tooth 151 out of engagement with the lead screw 150 and the tooth 153 into engagement with the lead screw 150 by pivoting the lever 154 clockwise, a notch 188 (see FIG. 9) in the slide 163 aligns with the detent 174 to lock the slide 163 against further movement in the X− direction as shown in FIG. 11. However, if the carrier 20 should continue to move in the X− direction due to overtravel, for example, the tab 170 continues to exert a force on the bellcrank 172. Since there can be no further sliding movement of the slide 163, this additional actuation of the bellcrank 172 causes counterclockwise rotation of the slide 163 about the detent 174. At this time, the stop 176 is aligned with a notch 189 in the slide 163 whereby the slide 163 may rotate counterclockwise. Thus, compensation of any overtravel of the carrier 20 in the X− direction is provided by the arrangement of this modification.

When the magnetic head 15 nears the completion of its movement in the X+ direction, a tab 190 on the carrier 20 engages an adjusting screw 191 on a bellcrank 192, which is pivotally mounted on the slide 163 by a stud 193, to cause the bellcrank 192 to pivot clockwise about the stud 193 until the bellcrank 192 engages the mounting screw 164. When this occurs, the slide 163 rotates clockwise about the detent 168. This results in the detent 174 no longer being disposed in the notch 188. The amount of rotation about the detent 168 is limited due to engagement of the slide 163 with a stop 194, which is secured to the support frame 25.

Continued movement of the magnetic head 15 in the X+ direction results in the slide 163 moving in the X+ direction. As a result, the fingers 177 engage the annular member 187 of the preloaded spring assembly 178 to cause movement of the rod 161 in the X+ direction. This movement pulls the tooth 151 into engagement with the lead screw 150 and then removes the tooth 153 from engagement with the lead screw 150.

When the slide 163 moves in the X+ direction to move the tooth 153 out of engagement with the lead screw 150 and the tooth 151 into engagement with the lead screw 150 by pivoting the lever 154 counterclockwise, the notch 169 in the slide 163 aligns with the detent 168 to lock the slide 163 against further movement in the X+ direction as shown in FIG. 9. However, if the carrier 20 should continue to move in the X+ direction due to overtravel, for example, the tab 190 continues to exert a force on the bellcrank 192. Since there can be no further sliding movement of the slide 163, this additional actuation of the bellcrank 192 causes clockwise rotation of the slide 163 about the detent 168. At this time, the stop 194 is aligned with a notch 195 in the slide 163 whereby the slide 163 may rotate clockwise. Thus, compensation of any overtravel of the carrier 20 in the X+ direction is provided by the arrangement of this modification.

When it is desired to manually move the head 15 in the Y directions, the pawl 152 is downwardly by depressing the scanning button 158. When the teeth 151 and 153 of the pawl 152 are removed from engagement with the lead screw 150, the frame 25 may be manually moved in the Y directions.

During this time, the magnetic head 15 continues to move in the X directions. When the button 158 is no longer depressed, it is desired to have the correct tooth of the teeth 151 and 153 return into engagement with the lead screw 150. Accordingly, when the head 15 completes its movement in the X− direction with the pawl 152 held down by the button 158, the spring 184 is compressed by the fingers 177 of the slide 163 due to movement of the slide 163 in the X− direction. Likewise, when the head 15 completes its movement in the X+ direction, the spring 186 is compressed by the fingers 177 of the slide 163 to movement of the slide 163 in the X+ direction.

Therefore, when the scanning button 158 is released, the lever 154 is properly positioned by the rod 161 to return the correct one of the teeth 151 and 153 into engagement with the lead screw 150. For example, if the magnetic head 15 is moving in the X+ direction when the scanning button 158 is released, the spring 184 is in a compressed condition and causes the rod 161 to move in the X− direction to move the tooth 153 to engage with the lead screw 151. Likewise, if the head 15 is moving in the X− direction when the scanning button 158 is released, the spring 186 is in a compressed condition and causes the rod 161 to move in the X+ direction whereby the tooth 151 is moved into engagement with the lead screw 150. Thus, this arrangement insures that the correct one of the teeth 151 and 153 is returned into engagement with the lead screw 150 in accordance with the direction of moveme[illegible] the magnetic head 15.

While the present invention has described the carrier for the magnetic head as moving relative to the record card in the X directions, it should be understood that the magnetic head could be held stationary and the record card moved in the X directions. This would necessitate the record card being mounted for movement by the lead screw 21 rather than the magnetic head.

While the present invention has described a spring motor assembly for continuously urging the magnetic head in the Y+ direction, it should be understood that other suitable means could be utilized for moving the magnetic head in the Y+ direction in which the moving means would be effective only when the magnetic head has completed moving in each of its directions and stepping is desired. Thus, the moving means would not need to continuously urge the magnetic head or the card in the Y+ direction as the spring motor assembly does.

While the magnetic head 15 has been described as being manually movable along the stepping axis by releasing the retaining means, it should be understood that the magnetic head 15 can be moved along the stepping axis by backspacing mechanism or forward spacing mechanism, for example. Each of these mechanisms also release the retaining means.

An advantage of this invention is that is insures that the retaining means for holding the magnetic head or the record card against stepping is correlated with the direction of the movement of the magnetic head during any movement of the magnetic head along the stepping axis in which the retaining means is released. Another advantage of this invention is that it prevents any backwards or nonintelligible information from being reproduced when manual movement of the magnetic head or card along the stepping axis is completed.

While the invention has been particularly shown and described with reference to preferred embodiments thereof, it will be understood by those skilled in the art that the foregoing and other changes in form and details may be made therein without departing from the spirit and scope of the invention.

What I claim is:

1. An apparatus for scanning a recording medium in opposite directions including:
- transducer means for recording on and/or listening to the recording medium;
- means to move one of said transducer means and the recording medium relative to the other uninterruptedly in opposite directions to cause scanning of the recording medium by said transducer means;
- means to step one of said transducer means and the recording medium a predetermined distance in a direction normal to the scanning direction;
- said stepping means includes means to allow stepping only when scanning in each of the directions is being completed;
- said allowing means including:
  - first means to allow stepping by said stepping means when scanning in one of the directions is being completed;
  - and second means to allow stepping by said stepping means when scanning in the other of the directions is being completed;
- means to render said first and second allowing means ineffective while said moving means remains effective to continue to move the movable one of said transducer means and the recording medium uninterruptedly for its complete travel in each of the opposite scanning directions when movement of the stepping one of said transducer means and the recording medium in directions normal to the scanning direction is desired irrespective of tee scanning position of the movable one of said transducer means and the recording medium;
- and means to insure that said first and second means of said allowing means are properly oriented with respect to the scanning direction of movement of the movable one of said transducer means and the recording medium when said rendering means becomes ineffective.

2. The apparatus according to claim 1 in which:
- said stepping means includes means to continuously urge the one of said transducer means and the recording medium that is stepped in the direction normal to the scanning directions;
- and means to prevent said urging means from being effective except when scanning in each of the directions is being completed.

3. The apparatus according to claim 1 including:
- first means to support one of said transducer means and the recording medium;
- second means to support the other of said transducer means and the recording medium;
- and said first support means being movable by said stepping means relative to said second support means to cause movement of the one of said transducer means and the recording medium supported by said first support means in the direction normal to the scanning directions.

4. The apparatus according to claim 1 in which:
- said insuring means includes means cooperating with said first and second allowing means;
- said cooperating means includes:
  - means responsive to the relative movement of said transducer means and the recording medium in each of the scanning directions irrespective of whether said rendering means is effective or ineffective;

and said responsive means moving said first allowing means to the position in which said first allowing means allows said stepping means to be effective when the movable one of said transducer means and the recording medium is completing movement in one of the scanning directions and moving said second allowing means to the position in which said second allowing means allows said stepping means to be effective when the movable one of said transducer means and the recording medium is completing movement in the other of the scanning directions.

5. The apparatus according to claim 4 in which:
said responsive means includes:
a slidably mounted member slidable between first and second positions;
first and second means mounted on said slidably mounted member in spaced relation to each other in the direction in which said slidably mounted member slides;
one of said first and second mounted means being movable when the movable one of said transducer means the the recording medium is completing movement in one of the scanning directions to move said slidably mounted member to one of its first and second positions and the other of said first and second mounted means being movable when the movable one of said transducer means and the recording medium is completing movement in the other of the scanning directions to move said slidably mounted member to the other of its first and second positions;
means to retain said slidably mounted member in one of its first and second positions when scanning is occurring in the opposite direction;
and means to release said retaining means in response to one of said first and second mounted means being movable.

6. The apparatus according to claim 5 in which said release means includes means to rotate said slidably mounted member to release said slidably mounted member from said retaining means before said slidably mounted member may slide.

7. The apparatus according to claim 1 in which:
said allowing means includes:
a pair of pawls;
means cooperating with said pawls to have engagement between one of said pawls and said cooperating means when scanning in one direction is being completed and to have engagement between the other of said pawls and said cooperating means when scanning in the other direction is being completed;
and said cooperating means and said pawls having a cooperating arrangement to control the predetermined distance of movement by said stepping means.

8. The apparatus according to claim 7 in which said pawls are pivotally mounted and movable into engagement with said cooperating means.

9. The apparatus according to claim 7 in which:
said insuring means includes:
second means cooperating with said pawls to cause movement of one of said pawls into engagement with said cooperating means and movement of the other of said pawls out of engagement with said cooperating means when movement of the movable one of said transducer means and the recording medium is being completed in one of the scanning directions and to cause movement of said other pawl into engagement with said cooperating means and movement of said one pawl out of engagement with said cooperating means when movement of the movable one of said transducer means and the recording medium is being completed in the other of the scanning directions;
and said second cooperating means including means responsive to the relative movement of said transducer means and the recording medium in each of the scanning directions irrespective of whether said rendering means is effective or ineffective.

10. The apparatus according to claim 9 in which:
said responsive means of said second cooperating means includes:
means movable between first and second positions, said movable means being movable from the first position to the second position when movement of the movable one of said transducer means and the recording medium is being completed in one of the scanning directions and from the second position to the first position when movement of the movable one of said transducer means and the recording medium is being completed in the other of the scanning directions;
means to retain said movable means in each of the first and second positions as relative movement of said transducer means and the recording medium occurs in the opposite scanning direction;
and means to release said movable means from said retaining means when movement of the movable one of said transducer means and the recording medium is being completed in the opposite direction to allow said movable means to move from one of the first and second positions to the other of the first and second positions.

11. The apparatus according to claim 10 in which said movable means is slidable in the scanning directions with said movable means sliding in the direction of movement of the movable one of said transducer means and the recording medium.

12. The apparatus according to claim 11 in which said release means includes means to rotate said movable means to release said movable means from said retaining means before said movable means may slide.

13. The apparatus according to claim 3 in which:
said allowing means includes:
a pair of teeth mounted on one of said first support means and said second support means;
a longitudinal member mounted on the other of said first support means and said second support means, said longitudinal member having means to engage each of said teeth;
said teeth being disposed on opposite sides of said longitudinal member;
said longitudinal member cooperating with said teeth to have engagement between one of said teeth and said engaging means of said longitudinal member when scanning in one direction is being completed and to have engagement between the other of said teeth and said engaging means of said longitudinal member when scanning in the other direction is being completed;
and said engaging means of said longitudinal member being arranged to determine the predetermined distance of movement of said first support means by said stepping means.

14. The apparatus according to claim 3 in which:
said allowing means includes:
a pair of pawls mounted on one of said first support means and said second support means;
means mounted on the other of said first support means and said second support means and cooperating with said pawls to have engagement between one of said pawls and said cooperating means when scanning in one direction is being completed and to have engagement between the other of said pawls and said cooperating means when scanning in the other direction is being completed;
and said operating means and said pawls having a cooperating arrangement to control the predetermined distance of movement of said first support means by said stepping means.

15. The apparatus according to claim 14 in which:
said cooperating means is a ratchet wheel with teeth on opposite sides;

said ratchet wheel being rotatable when said stepping means moves said first support means;

said ratchet wheel having teeth on one side for cooperation with one of said pawls and teeth on the opposite side for cooperation with the other of said pawls;

and said teeth on one side of said ratchet wheel being staggered in the rotary direction with respect to the teeth on the other side to produce he predetermined distance of movement by said stepping means by said ratchet wheel rotating.

146. The apparatus according to claim 14 in which:

said cooperating means is a longitudinal member having means to engage said pawls;

and said pawls being spaced from each other in the longitudinal direction of said longitudinal member to produce the predetermined distance of movement of said first support means by said stepping means.

17. The apparatus according to claim 16 in which:

said longitudinal member is a rack;

and said means on said longitudinal member are teeth on said rack.

UNITED STATES PATENT OFFICE
CERTIFICATE OF CORRECTION

Patent No. 3,583,709 Dated June 8, 1971

Inventor(s) William L. Dollenmayer

It is certified that error appears in the above-identified patent and that said Letters Patent are hereby corrected as shown below:

On the cover in the ABSTRACT, line 6, "locations" should read -- directions -- . Column 1, line 6, after "609,232" insert a comma; line 22, "may", first occurrence, should read -- my -- . Column 2, line 71, "may" should read -- my -- . Column 3, line 28, after "lead" insert -- screw -- ; line 60, "30" should read -- 39 -- . Column 4, line 66, "of" should be -- for -- . Column 5, line 2, "the" should be -- a -- ; line 50, "screws" should be -- screw -- . Column 7, line 6, "engaged" should be -- engage -- ; line 30, cancel "the". Column 8, line 61, "The" should be -- Then -- . Column 9, line 4, "car" should be -- card -- ; line 24, cancel "is". Column 10, line 8, "plat" should be -- plate -- ; line 19, "he" should be -- the -- ; line 37, "he" should be -- the -- ; line 59, after "140" insert a period. Column 11, line 58, "125" should be -- 25 -- . Column 12, line 14, "side" should be -- slide -- . Column 13, line 18, after "is" insert -- moved -- ; line 31, after "163" insert -- due -- ; line 72, "is" (second occurrence) should be -- it -- . Column 14, line 42, "tee" should be -- the -- . Column 15, line 22, cancel "the" (second occurrence) and substitute -- and -- . Column 16, line 69, "operating" should be -- cooperating -- . Column 17, line 8, "he" should be -- the -- ; line 11, "146" should be -- 16 -- .

Signed and sealed this 24th day of October 1972.

(SEAL)
Attest:

EDWARD M.FLETCHER,JR.
Attesting Officer

ROBERT GOTTSCHALK
Commissioner of Patents